United States Patent
Lin et al.

(10) Patent No.: US 9,803,894 B2
(45) Date of Patent: Oct. 31, 2017

(54) DUAL-STAGE ENTHALPY-INCREASING AIR-CONDITIONING SYSTEM

(71) Applicant: Gree Electric Appliances, Inc. of ZHUHAI, Zhuhai, Guangdong (CN)

(72) Inventors: Jinhuang Lin, Zhuhai (CN); Shaolin Chen, Zhuhai (CN); Haiyuan Jin, Zhuhai (CN); Zhenjian He, Zhuhai (CN); Lv Liu, Zhuhai (CN); Yunhui Zou, Zhuhai (CN); Chunyu Cheng, Zhuhai (CN)

(73) Assignee: GREE ELECTRIC APPLIANCES, INC. OF ZHUHAI, Zhuhai, Guangdong (CN)

( * ) Notice: Subject to any disclaimer, the term of this patent is extended or adjusted under 35 U.S.C. 154(b) by 0 days.

(21) Appl. No.: 14/787,245

(22) PCT Filed: Apr. 30, 2014

(86) PCT No.: PCT/CN2014/076642
§ 371 (c)(1),
(2) Date: Oct. 26, 2015

(87) PCT Pub. No.: WO2014/177059
PCT Pub. Date: Nov. 6, 2014

(65) Prior Publication Data
US 2016/0102892 A1    Apr. 14, 2016

(30) Foreign Application Priority Data

May 3, 2013   (CN) .................... 2013 2 0236401 U

(51) Int. Cl.
*F25B 13/00*    (2006.01)

(52) U.S. Cl.
CPC ...... *F25B 13/00* (2013.01); *F25B 2341/0662* (2013.01); *F25B 2400/13* (2013.01); *F25B 2400/23* (2013.01)

(58) Field of Classification Search
CPC ..................... F25B 2400/23; F25B 2341/0662
See application file for complete search history.

(56) References Cited

U.S. PATENT DOCUMENTS

| | | | | |
|---|---|---|---|---|
| 4,262,492 A | * | 4/1981 | Morita | .................... F25B 13/00 62/324.6 |
| 2006/0010899 A1 | | 1/2006 | Lifson et al. | |
| 2006/0032267 A1 | * | 2/2006 | Kamimura | ................ F25B 1/10 62/498 |

FOREIGN PATENT DOCUMENTS

| | | |
|---|---|---|
| CN | 200989697 Y | 12/2007 |
| CN | 101165438 A | 4/2008 |

(Continued)

*Primary Examiner* — Emmanuel Duke
(74) *Attorney, Agent, or Firm* — Li & Cai Intellectual Property (USA) Office

(57) ABSTRACT

A dual-stage enthalpy-increasing air-conditioning system comprises a compressor (1), an outdoor heat exchanger (3), a first throttle component (8) and an indoor heat exchanger (11), wherein the components are connected via pipelines; the system also comprises a flash evaporator (6) and a second throttle component (7); a first connecting port of the flash evaporator (6) is connected with a first connecting port of the first throttle component (8); a second connecting port of the first throttle component (8) is connected with the indoor heat exchanger (11); a second connecting port of the flash evaporator (6) is connected with an air supplementing port of the compressor (1); a third connecting port of the flash evaporator (6) is connected with a first connecting port of the second throttle component (7); a second connecting port of the second throttle component (7) is connected with the outdoor heat exchanger (3).

5 Claims, 1 Drawing Sheet

(56) References Cited

FOREIGN PATENT DOCUMENTS

| | | | |
|---|---|---|---|
| CN | 201043823 Y | | 4/2008 |
| CN | 201062900 Y | | 5/2008 |
| CN | 201387176 Y | | 1/2010 |
| CN | 101699184 A | | 4/2010 |
| CN | 201488273 U | | 5/2010 |
| CN | 101726132 A | | 6/2010 |
| CN | 201621800 U | * | 11/2010 |
| CN | 201621800 U | | 11/2010 |
| CN | 102135341 A | | 7/2011 |
| CN | 102538273 A | | 7/2012 |
| CN | 202648236 U | * | 1/2013 |
| CN | 202648236 U | | 1/2013 |
| CN | 103245155 A | | 8/2013 |
| CN | 203286821 U | | 11/2013 |
| JP | H0849929 A | | 2/1996 |

* cited by examiner

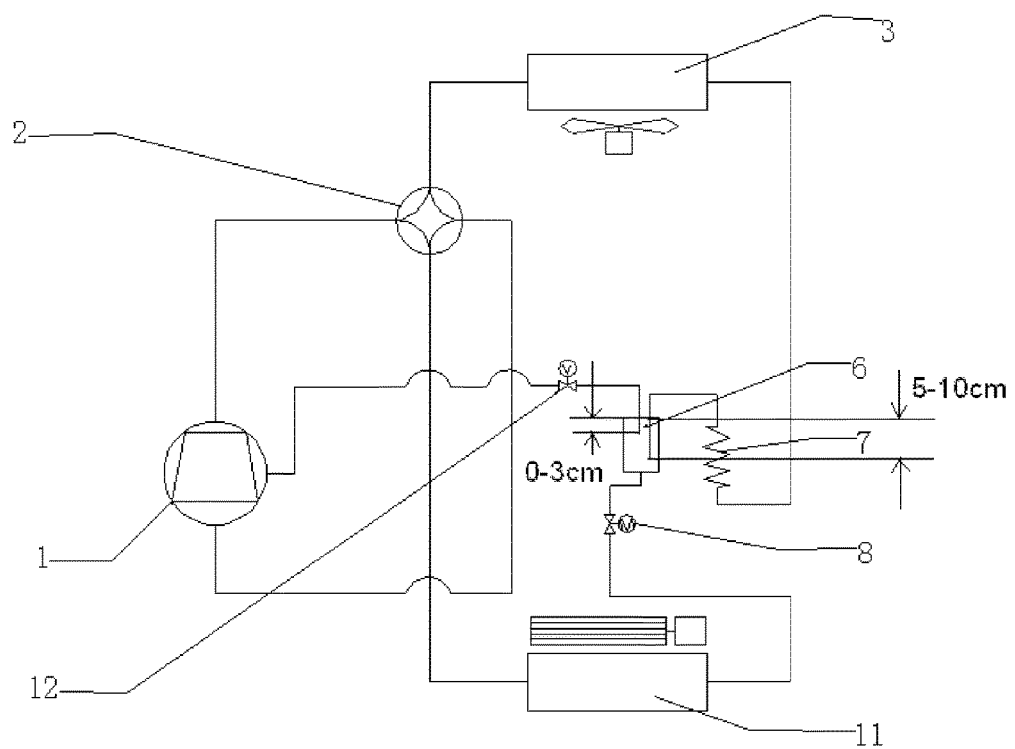

DUAL-STAGE ENTHALPY-INCREASING AIR-CONDITIONING SYSTEM

TECHNICAL FIELD

The present utility model relates to an air-conditioning system, and in particular to a dual-stage enthalpy-increasing air-conditioning system.

BACKGROUND

At present, with the improvement of people's life quality, air conditioners have become necessities for people's daily life; however, the compressor of a common air conditioner is a single-stage compressor, which has a low efficiency in converting mechanical energy into thermal energy and a high energy consumption. With the overall development of energy-saving technologies, air conditioners with dual-stage compressors are available on market; however, there is only one throttle device provided in this type of air-conditioning systems, which is unintelligent in the adjustment of air compensation and evaporation capacity for different operation conditions and frequencies, and leads to a poor system reliability.

SUMMARY

In order to overcome the defects existing in prior art, the present utility model provides a dual-stage enthalpy-increasing air-conditioning system, in which a throttle device is provided at the upstream and downstream of the flash evaporator respectively, for effectively controlling evaporation capacity and controlling the amount of air inhaled by the air supplementing port of the compressor, so as to enable a more stable operation of the air conditioner.

The present utility model is realized by the following technical solutions.

A dual-stage enthalpy-increasing air-conditioning system, comprising: a compressor, an outdoor heat exchanger, a first throttle component, an indoor heat exchanger, a flash evaporator and a second throttle component, wherein the components are connected via pipelines; the system also comprises at least one flash evaporator and a second throttle component; a first connecting port of the flash evaporator is connected with a first connecting port of the first throttle component; a second connecting port of the first throttle component is connected with the indoor heat exchanger; a second connecting port of the flash evaporator is connected with an air supplementing port of the compressor; a third connecting port of the flash evaporator is connected with a first connecting port of the second throttle component; a second connecting port of the second throttle component is connected with the outdoor heat exchanger.

Preferably, an air outlet of the compressor is connected with a four-way valve; the remaining three ports of the four-way valve are connected with an air inlet of the compressor, the outdoor heat exchanger and the indoor heat exchanger respectively.

Preferably, an air supplementing two-way valve is provided between the second connecting port of the flash evaporator and the air supplementing port of the compressor.

Preferably, the first throttle component is an electronic expansion valve.

Preferably, the second throttle component is a throttling capillary.

Preferably, the first connecting port of the flash evaporator is located at a bottom of the flash evaporator; a pipeline connected with the first connecting port of the flash evaporator is flush with the bottom of the flash evaporator.

Preferably, the third connecting port of the flash evaporator is located at a top of the flash evaporator; a pipeline connected with the third connecting port of the flash evaporator stretches inside the flash evaporator with 5-10 cm to a bottom of the flash evaporator.

Preferably, the second connecting port of the flash evaporator is located at a top of the flash evaporator; a pipeline connected with the second connecting port of the flash evaporator stretches inside the flash evaporator with 0-3 cm from the top of the flash evaporator.

In the dual-stage enthalpy-increasing air-conditioning system provided by the present utility model, both connecting ports of the flash evaporator are connected with a throttle component respectively, which not only controls the evaporation capacity of the evaporator, but also controls the amount of air inhaled by the air supplementing port of the compressor, thereby leading the air-conditioning system to operate more stably while supplementing air.

BRIEF DESCRIPTION OF THE DRAWINGS

In order to better understand the embodiments in the present utility model or the technical solutions in prior art, accompanying drawings needed in the embodiments of the present utility model or the description of prior art are simply illustrated below; obviously, those accompanying drawings described below are only part embodiments of the present utility model; for those skilled in the art, other accompanying drawings can be obtained according to these accompanying drawings without creative labour.

FIG. 1 shows a connection diagram of an air-conditioning system according to the present utility model.

DETAILED DESCRIPTION OF THE EMBODIMENTS

As shown in FIG. 1, the present utility model provides a dual-stage enthalpy-increasing air-conditioning system, comprising a compressor 1, an outdoor heat exchanger 3, a first throttle component 8 and an indoor heat exchanger 11, wherein the components are connected via pipelines; the system also comprises a flash evaporator 6 and a second throttle component 7; a first connecting port of the flash evaporator 6 is connected with a first connecting port of the first throttle component 8; a second connecting port of the first throttle component 8 is connected with the indoor heat exchanger 11; a second connecting port of the flash evaporator 6 is connected with an air supplementing port of the compressor 1; a third connecting port of the flash evaporator 6 is connected with a first connecting port of the second throttle component 7; a second connecting port of the second throttle component 7 is connected with the outdoor heat exchanger 3.

An air outlet of the compressor is connected with a four-way valve 2; the remaining three ports of the four-way valve 2 are connected with an air inlet of the compressor 1, the outdoor heat exchanger 3 and the indoor heat exchanger 11 respectively.

An air supplementing two-way valve 12 is provided between the second connecting port of the flash evaporator 6 and the air supplementing port of the compressor 1; in this embodiment, the first throttle component 8 is an electronic expansion valve; the second throttle component 7 is a throttling capillary; the first connecting port of the flash evaporator is located at the bottom of the flash evaporator, and the pipeline connected therewith is flush with the bottom of the flash evaporator; the third connecting port of the flash evaporator is located at the top of the flash evaporator, and the pipeline connected therewith stretches inside the flash evaporator with 5-10 cm to the bottom of the flash evaporator; the second connecting port of the flash evaporator is located at the top of the flash evaporator, and the pipeline connected therewith stretches inside the flash evaporator with 0-3 cm from the top of the flash evaporator.

When the air conditioner works in the refrigeration mode, the refrigerant compressed by the compressor 1 enters the outdoor heat exchanger 3 via the four-way valve 2 to condense and release heat, and then enters the flash evaporator 6 after throttled by the second throttle component 7; at this time, the refrigerant flows through two ways. One way is that the saturated refrigerant gas in the upper part of the flash evaporator flows out from the second connecting port of the flash evaporator and then flows into the air supplement port of the compressor 1 via the air supplementing two-way valve 12; the other way is that the refrigerant liquid enters the indoor heat exchanger 11 through the first throttle component 8 to be evaporated as low-temperature and low-pressure refrigerant gas, which then enters the compressor 1 through the air inlet of the compressor, gets compressed at the bottom end of the compressor and mixed with the saturated refrigerant gas flowing through the air supplementing port of the compressor in the middle cavity, and then is exhausted out the compressor after second compression; at this time, one cycle is completed.

When the air conditioner works in the heat mode, the operation is opposite to that of the refrigeration mode; the refrigerant compressed by the compressor 1 enters the indoor heat exchanger 11 via the four-way valve 2 to condense and release heat, and then enters the flash evaporator 6 after throttled by the first throttle component 8; at this time, the refrigerant flows through two ways. One way is that the saturated refrigerant gas in the upper part of the flash evaporator flows out from the second connecting port of the flash evaporator and then flows into the air supplement port of the compressor via the air supplementing two-way valve 12; the other way is that the refrigerant liquid enters the outdoor heat exchanger 3 after throttled by the second throttle component 7 to be evaporated as low-temperature and low-pressure refrigerant gas, which then enters the compressor through the air inlet of the compressor, gets compressed at the bottom end of the compressor and mixed with the saturated refrigerant gas flowing through the air supplementing port of the compressor in the middle cavity, and then is exhausted out the compressor after second compression; at this time, one cycle is completed.

In this present utility model, two sides of the flash evaporator are provided with a first throttle component 8 and a second throttle component 7 respectively; no matter the system refrigerates or heats, the system can adjust both evaporation capacity and air compensation, thereby ensuring the operation stability of the system.

The above content gives a detailed description for the dual-stage enthalpy-increasing air-conditioning system provided in the present utility model. In this paper, a specific instance is adopted to illustrate the principle and implementation of the present utility model. The description of the embodiment above just is to help understand the method and core idea of the present utility model. It should note that, for the ordinary staff in the art, umpty changes and modifications can be made without departing from the principle of the present utility model, and these changes and modifications shall fall into the protection scope of claims of the present utility model.

What is claimed is:

1. A dual-stage enthalpy-increasing air-conditioning system, comprising: a compressor 1, an outdoor heat exchanger 3, a first throttle component 8, an indoor heat exchanger 11, a flash evaporator 6 and a second throttle component 7, wherein the components are connected via pipelines; a first connecting port of the flash evaporator is connected with a first connecting port of the first throttle component; a second connecting port of the first throttle component is connected with the indoor heat exchanger; a second connecting port of the flash evaporator is connected with an air supplementing port of the compressor; a third connecting port of the flash evaporator is connected with a first connecting port of the second throttle component; a second connecting port of the second throttle component is connected with the outdoor heat exchanger; an air supplementing two-way valve 12 is provided between the second connecting port of the flash evaporator and the air supplementing port of the compressor; the first connecting port of the flash evaporator is located at a bottom of the flash evaporator; a pipeline connected with the first connecting port of the flash evaporator is flush with the bottom of the flash evaporator; the third connecting port of the flash evaporator is located at a top of the flash evaporator; a pipeline connected with the third connecting port of the flash evaporator stretches inside the flash evaporator with 5-10 cm to a bottom of the flash evaporator; when the air-conditioning system works in a heat mode or in a refrigeration, the air supplementing two-way valve 12 is opened, wherein when the air conditioner works in the refrigeration mode, refrigerant compressed by the compressor 1 enters the outdoor heat exchanger 3 via a four-way valve 2 to condense and release heat, and then enters the flash evaporator 6 after throttled by the second throttle component 7, at this time, the refrigerant flows through two ways, One way is that saturated refrigerant gas in an upper part of the flash evaporator flows out from the second connecting port of the flash evaporator and then flows into an air supplement port of the compressor 1 via the air supplementing two-way valve 12, the other way is that refrigerant liquid enters the indoor heat exchanger 11 through the first throttle component 8 to be evaporated as low-temperature and low-pressure refrigerant gas, which then enters the compressor 1 through an air inlet of the compressor, gets compressed at a bottom end of the compressor and mixed with the saturated refrigerant gas flowing through the air supplementing port of the compressor in middle cavity, and then is exhausted out the compressor after second compression; at this time, one cycle is completed, when the air conditioner works in the heat mode, the operation is opposite to that of the refrigeration mode, the refrigerant compressed by the compressor 1 enters the indoor heat exchanger 11 via the four-way valve 2 to condense and release heat, and then enters the flash evaporator 6 after throttled by the first throttle component 8, at this time, the refrigerant flows through two ways, One way is that the saturated refrigerant gas in the upper part of the flash evaporator flows out from the second connecting port of the flash evaporator and then flows into the air supplement port of the compressor via the air supplementing two-way valve 12; the other way is that the refrigerant liquid enters the outdoor heat exchanger 3 after throttled by the second throttle component 7 to be evaporated as low-temperature and low-pressure refrigerant gas, which then enters the compressor through the air inlet of the compressor, gets compressed at the bottom end of the compressor and mixed with the saturated refrigerant gas flowing through the air supplementing port of the compressor in the middle cavity, and then is exhausted out the compressor after second compression; at this time, one cycle is completed.

2. The dual-stage enthalpy-increasing air-conditioning system according to claim 1, wherein an air outlet of the compressor is connected with a four-way valve; the remaining three ports of the four-way valve are connected with an air inlet of the compressor, the outdoor heat exchanger and the indoor heat exchanger respectively.

3. The dual-stage enthalpy-increasing air-conditioning system according to claim 1, wherein the first throttle component is an electronic expansion valve.

4. The dual-stage enthalpy-increasing air-conditioning system according to claim 1, wherein the second throttle component is a throttling capillary.

5. The dual-stage enthalpy-increasing air-conditioning system according to claim 1, wherein the second connecting port of the flash evaporator is located at a top of the flash evaporator; a pipeline connected with the second connecting port of the flash evaporator stretches inside the flash evaporator with 0-3 cm from the top of the flash evaporator.

* * * * *